Aug. 31, 1926.
G. A. ANDERSON
TRUCK SIDE FRAME
Filed Oct. 17, 1922
1,597,947
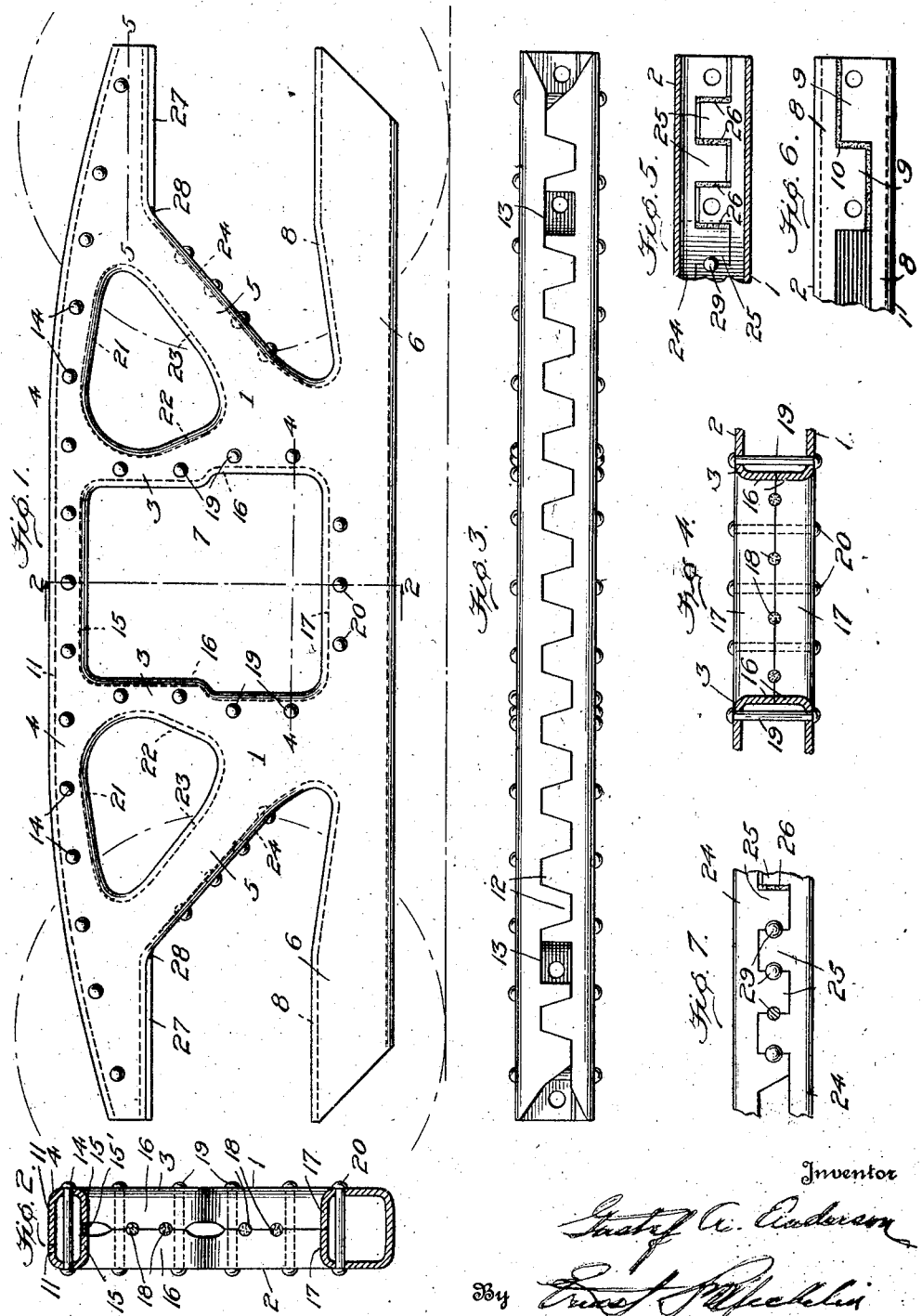

Patented Aug. 31, 1926.

1,597,947

UNITED STATES PATENT OFFICE.

GUSTAF A. ANDERSON, OF BALTIMORE, MARYLAND, ASSIGNOR, BY MESNE ASSIGNMENTS, TO THE SYMINGTON COMPANY, A CORPORATION OF MARYLAND.

TRUCK SIDE FRAME.

Application filed October 17, 1922. Serial No. 595,095.

My invention relates to side frames for car trucks and has been primarily designed to provide a construction which is very strong and stiff but comparatively light in weight and in which costs incident to maintenance are reduced to a minimum.

The principal object of my invention, generally stated, resides in forming a car truck side frame of spaced outer and inner side walls of sheet metal, said walls being shaped from a continuous sheet of wrought metal united at a plurality of points and each having a plurality of truck column portions, a plurality of top arch bar portions, a plurality of bottom arch bar portions, and a plurality of pedestal tie bar portions.

Particularly stated, my present invention has for an object the production of a car truck side frame from a continuous sheet or blank of metal folded at its bottom and joined together at the top portion and at other points by means of interlocking connections, some or all of which may be welded.

Another object of the invention is to provide a car truck side frame formed from a continuous blank with portions of the abutting edges of the top and bottom arch bar portions and pedestal tie bar portions being cut to fit one within the other, thereby providing a strong joint construction in which longitudinal thrusts imparted to the car truck will be effectually resisted and the strains upon the joints uniting the side walls reduced to a minimum.

A further object of the invention is to provide means for effectively uniting the abutted edges of the side frame blank and especially the truck column and lower arch bar portions by means of rivets or welds, said rivets or welds serving to maintain the surfaces of abutting portions of the blank in continuous smooth relation and being placed under shear when resisting strains incident to service conditions.

A still further object of the invention is to provide a car truck side frame from a continuous sheet of metal and reinforce the lower portion of each bottom arch bar by a strengthening plate welded thereto and adapted to engage the upper portion of the journal box.

The invention further consists in providing means including tie rivets or bolts along the top arch bar portions, the truck column portions and spring plank seat portion for further rigidifying the side frame in a simple and inexpensive manner.

Another feature of the invention consists in forming a car truck side frame from a continuous sheet of metal shaped to form spaced inner and outer side walls and in providing each of said side walls with pedestal tie bar portions, said pedestal tie bar portions having their lower edges arranged in a straight line and their upper edges parallel thereto beneath the journal boxes, thereby forming chambered or box-like pedestal tie bars of increased strength value.

A further feature of the invention consists in the method of manufacturing a car truck side frame by forming from a sheet of metal a blank having corresponding side frame portions which are symmetrically disposed with respect to an axis of symmetry passing between them, cutting parts off each of said corresponding portions of the blank to provide interlocking flanges, bending corresponding portions of said blank to form said flanges, folding the blank along the line which throughout its length is parallel to the said axes of symmetry, uniting said flanges by interlocking the cut portions, connecting said interlocking portions for maintaining the same in alinement, and finally further uniting said interlocked portions transversely of the side frame by welding or riveting or both.

There are other features of the invention relating to the particular construction of the parts as will more fully hereinafter appear.

In the drawings chosen to illustrate my invention and in which corresponding reference characters designate similar parts in the several views:

Figure 1 is a side view of a car truck side frame constructed in accordance with my present invention.

Figure 2 is a transverse vertical sectional view on the line 2—2 of Figure 1.

Figure 3 is a view in top plan.

Figure 4 is a detail longitudinal horizontal sectional view on the line 4—4 of Figure 1.

Figure 5 is a similar view on the line 5—5 of Figure 1.

Figure 6 is a detail top plan view of the end of a pedestal tie bar portion.

Figure 7 is a detail face view of the lower side of one of the bottom arch bar portions.

Referring to the drawings, my improved car truck side frame is formed from a continuous sheet metal blank and includes an outer wall 1 and an inner wall 2, said walls being arranged in spaced relation and each being provided with a plurality of truck column portions 3, a plurality of top arch bar portions 4, a plurality of bottom arch bar portions 5, and a plurality of pedestal tie bar portions 6. The truck column portions are spaced apart, as shown, to form the bolster opening 7.

The blank of sheet metal is folded at the bottom on a straight line parallel to its axis of symmetry so as to cause the bottom of the side frame and more particularly the pedestal tie bar portions to extend in substantially straight parallel planes.

The portions of the pedestal tie members extending beneath the journal boxes are preferably increased in cross sectional area, said portions forming box-like tie supports of maximum strength value. Each pedestal tie bar portion is provided with inwardly extending stiffening flanges 8, the outer ends of said flanges arranged beneath the journal box having portions in the form of projections 9 adapted to be interlocked or meshed, as best shown in Figure 6. The joint between the longitudinally interlocked projections 9 is preferably welded, as indicated at 10, said weld constituting a staggered joint of maximum strength value directly beneath the journal box. Longitudinally alined openings are provided in the projections 9 for the reception of the journal box bolts. The stiffening flanges 8 provided between the truck column portions and the interlocked and welded projections 9 are preferably spaced apart, as shown in Figure 6.

The ends of the relatively deep pedestal tie bar portions are open, as shown, to provide ready accessibility to the journal box bolts, the lower corners of said ends being angled off to provide a light weight and also a neat appearing side frame, as will be understood.

The upper part of the continuous blank sheet is united to form the top arch bar portions 4, inwardly extending stiffening flanges 11 being provided at the top of both the inner and outer walls of the side frame to resist transverse strains. The inner abutting edges of the flanges are preferably interlocked or meshed, each of the flanges 11 being provided with a series of projections, tongues or lugs 12 forming teeth in the notches or spaces between which similarly formed projections, tongues or lugs on the adjacent flange are fitted, thereby providing a relatively long staggered joint between the inner and outer walls of the side frame capable of withstanding maximum longitudinal and other strain to which the side frame is subjected under service conditions.

The opposed flanges 11 are preferably notched or cut throughout their length to provide a continuous joint of a combined transverse and longitudinal configuration, openings 13 being left, however, at the ends of the top arch bar portions to receive the journal box bolts. The outermost of said openings 13 are formed by cutting back the ends of the flanges 11, the innermost of said openings being preferably square and formed by cutting away corresponding portions of the interlocking projections 12. The notched edge portions of the stiffening flanges 11 overlie each other longitudinally of the truck each of said notched flanges being preferably of equal size to uniformly resist the strains.

The top arch bar is preferably cambered, the cutting of the upper notched or tooth edge portions being readily determined to provide for same, the blocking die member preferably cutting said teeth and other portions of the blank sheet in one operation.

A series of transversely extending tie rivets 14 is provided along the upper portion of the side frame, said rivets serving to firmly unite the inner and outer walls and maintain them in spaced relation. The rivets are arranged at intervals and serve to securely hold the interlocked projections in rigid position. Portions of the staggered joint between the interlocked projections may be suitably welded if desired.

The intermediate or central portions of the top arch bar portions are preferably provided with inwardly extending flanges 15, said flanges being welded together, as indicated at 15'. These flanges 15 are designed to merge into the flanges 16 surrounding the truck column portions, as shown. Both the inner and outer walls of the side frame are formed with the flanges 16, said flanges being adapted to stiffen the truck column portions 3. At their lower ends the flanges 16 are designed to preferably merge into the respective flanges 17, which latter flanges are abutted and welded in a horizontal plane to form the spring plank seat portion of the truck. As constructed the respective groups of stiffening flanges 15, 16 and 17 completely border and reinforce the bolster opening in both the inner and outer walls of the side frame.

The flanges 15 and 16 are preferably united at a plurality of points by a series of welds 18, said welds being located between adjacent notched edges of the flanges, as best shown in Figures 2 and 4. By arranging the welds in the manner shown the surface portions of adjacent flanges are effectively maintained in the same transverse planes. In addition, the welded portion forms a strong tie and is utilized to take a part of the strain. The inner edges of the respective flanges 15 and 16 are preferably abutted at intervals between the welds, portions of said edges, however, of the flanges between certain of other of said welds being spaced apart, as shown in Figure 2.

The truck column portions are further reinforced by a series of the rivets 19, said rivets uniting opposite truck column portions of the side walls of the side frame. Other tie rivets 20 are arranged beneath the bolster opening, said opening being surrounded by the series of rivets just referred to and certain of the group of rivets 14 hereinbefore described as uniting the upper portions of the side walls.

Between the truck column portions 3 and the respectively adjacent ends of the side frame, the top arch bar portions 4 of the inner and outer walls are preferably reinforced by oppositely extending flanges 21. The outer edge of each bolster column portion is likewise preferably reinforced by an internal flange 22, while the bottom arch bar portions 5 of the inner and outer walls may advantageously be provided along their upper edges with stiffening flanges 23, the said flanges 21, 22 and 23 of each wall being continuous and framing a substantially triangular opening, as shown.

Along the lower edges, the bottom arch bar portions 5 of the side frame walls are stiffened by inwardly extending flanges 24 which are preferably prolonged so as to extend over the journal boxes and also to reinforce the junctions of the said arch bars with the pedestal tie bar portions 6. The opposed edges of the flanges 24 along the lower part of the bottom arch bars and the portions thereof extending over the journal boxes, are provided with a plurality of projections or teeth 25 adapted to be meshed or interlocked, as shown in Figures 7 and 5. The portions extending over the journal boxes are preferably transversely welded, as indicated at 26, a plate 27 being also arranged beneath and united across the staggered joint. The plate 27 is further welded at 28 at the bend between the lower arch bar portion and its extension, as best shown in Figure 1. The plate serves to reinforce this portion of the side frame resting directly upon the journal box. Openings for the journal box bolts are provided in the plate and the adjacent projections 25.

The lower edges of the bottom arch bar portions are similarly interlocked by the meshing projections or teeth 25, rivets 29 being provided in this instance to effectively join the surface portions of adjacent flanges in a smooth plane. The heads of the rivets overlie adjacent projections and serve to firmly unite the parts to resist the strains imparted thereto. The edges of the projections or teeth 25 are notched to receive the rivets, as shown, said rivets thereby acting to resist transverse strains also.

Rivets, such as indicated at 29, or welds such as shown at 18, may be interchangeably utilized according to the exact needs and convenience in manufacture. The particular arrangement and location shown I have found to be advantageous and illustrate at least one embodiment of my improved manner of effectively uniting opposed flanges of spaced side frame walls.

It will be perceived that a car truck side frame embodying the invention may be manufactured by first forming from a sheet of metal a blank having corresponding side frame portions which are symmetrically disposed with respect to an axis of symmetry of the blank passing between them, providing portions on said blank adapted to be fitted in interlocked relation, bending corresponding portions of the blank to form flanges which project from the sides thereof, then folding said blank so as to cause the said portions thereof to be fitted in interlocked relation, and finally uniting said interlocked portions and said flanges.

My improved method of manufacture also involves the use of rivets or welds adapted to maintain the interlocked portions of the flanges in alined and smooth relation, and the utilization of transversely arranged tie members for further uniting said interlocked portions.

It will be noted that a truck side frame embodying my invention not only has the merit of being constructed of light and reliable material, but its parts and more especially the joints thereof, are so formed and united that they will withstand maximum strains under service conditions.

I claim:

1. A car truck side frame involving a continuous metal sheet shaped to form an outer wall and an inner wall arranged in spaced relation, each of said walls having a plurality of truck column portions, a plurality of top arch bar portions, a plurality of bottom arch bar portions, and a plurality of pedestal tie bar portions; and means including an interlocked portion of said walls for connecting the same.

2. A car truck side frame including spaced inner and outer side walls, each of said walls having a plurality of truck column portions, a plurality of top arch bar portions, a plurality of bottom arch bar portions, and a plurality of pedestal tie bar portions; and a series of staggered interlocking portions extending from each side wall and adapted to be connected.

3. A car truck side frame including spaced inner and outer side walls, each of said walls having a plurality of truck column portions, a plurality of top arch bar portions, a plurality of bottom arch bar portions, and a plurality of pedestal tie bar portions; and means extending transversely to the direction of length of said arch bar portion for interlocking portions of said side walls together.

4. A car truck side frame including spaced inner and outer side walls, each of said walls having a plurality of truck column portions, a plurality of top arch bar portions, a plurality of bottom arch bar portions, and a plurality of pedestal tie bar portions; a plurality of staggered intermeshing portions provided on said side walls and adapted to unite the same.

5. A car truck side frame including spaced inner and outer side walls, each of said walls having a plurality of truck column portions, a plurality of top arch bar portions, a plurality of bottom arch bar portions, and a plurality of pedestal tie bar portions; and a series of spaced projections provided on each side wall, said projections being adapted to be fitted one within the other for uniting the side walls.

6. A car truck side frame including spaced inner and outer side walls, each of said walls having a plurality of truck column portions, a plurality of top arch bar portions, a plurality of bottom arch bar portions and a plurality of pedestal tie bar portions; inwardly extending flanges formed on said side walls, and a plurality of projections provided on said flanges and adapted to be connected in meshed relation for firmly uniting the side walls.

7. A car truck side frame involving a continuous sheet of metal folded at the bottom and shaped to form an outer side wall and an inner side wall, arranged in spaced relation, each of said walls having a plurality of truck column portions, a plurality of top arch bar portions, a plurality of bottom arch bar portions, and a plurality of pedestal tie bar portions, said top arch bar portions being united at their upper edges by a series of transversely and longitudinally disposed joints.

8. A car truck side frame involving a continuous sheet of metal folded at the bottom and shaped to form an outer side wall and an inner side wall arranged in spaced relation, each of said walls having a plurality of truck column portions, a plurality of top arch bar portions, a plurality of bottom arch bar portions, and a plurality of pedestal tie bar portions, said top arch bar portions being united by a staggered joint.

9. A car truck side frame involving a sheet of metal shaped to form an outer side wall and an inner side wall arranged in spaced relation, each of said walls having a plurality of truck column portions, a plurality of top arch bar portions, a plurality of bottom arch bar portions, and a plurality of pedestal tie bar portions; said top arch bar portions being connected by intermeshing portions, and means including a plurality of transversely arranged tie members uniting said walls and adapted to maintain the said intermeshed portions in engagement.

10. A car truck side frame involving a sheet of metal shaped to form an outer side wall and an inner side wall arranged in spaced relation, each of said walls having a plurality of truck column portions, a plurality of top arch bar portions, a plurality of bottom arch bar portions, and a plurality of pedestal tie bar portions; said top arch bar portions being united at their upper edges, and a plurality of rivets for connecting the side wall portions of the said top arch bar portions.

11. A car truck side frame involving a sheet of metal shaped to form an outer side wall and an inner side wall arranged in spaced relation, each of said walls having a plurality of truck column portions, a plurality of top arch bar portions, a plurality of bottom arch bar portions, and a plurality of pedestal tie bar portions; said top arch bar portions being united in interlocked relation, and means for maintaining the interlocked portions in rigid position.

12. A car truck side frame including spaced inner and outer side walls, each of said side walls having a plurality of truck column portions, a plurality of top arch bar portions, a plurality of bottom arch bar portions, and a plurality of pedestal tie bar portions; said top arch bar portions being provided with a series of staggered intermeshing projections, some of said projections being cut away to provide journal box bolt openings.

13. A car truck side frame involving a continuous sheet of metal folded at the bottom and shaped to form inner and outer side walls arranged in spaced relation, each of said side walls having a plurality of truck column portions, a plurality of top arch bar portions, a plurality of bottom arch bar portions, and a plurality of pedestal tie bar portions; said truck column portions being provided with stiffening flanges, the edges of which are notched, and means uniting said flanges, said means being located within said notched edges.

14. A car truck side frame involving a continuous sheet of metal folded at the bottom and shaped to form inner and outer side walls arranged in spaced relation, each of said side walls having a plurality of truck column portions, a plurality of top arch bar portions, a plurality of bottom arch bar portions, and a plurality of pedestal tie bar portions, said truck column portions being provided with flanges adapted to be connected in the same plane by welds extending into the edges of the flanges.

15. A car truck side frame involving a continuous sheet of metal folded at the bottom and shaped to form inner and outer side walls arranged in spaced relation, each of said side walls having a plurality of truck column portions, a plurality of top arch bar portions, a plurality of bottom arch bar portions, and a plurality of pedestal tie bar portions, said truck column portions being provided with flanges adapted to be connected and maintained in the same plane, and means including transversely arranged tie members connecting the side walls.

16. A car truck side frame involving a continuous sheet of metal folded at the bottom and shaped to form inner and outer side walls arranged in spaced relation, each of said side walls having a plurality of truck column portions, a plurality of top arch bar portions, a plurality of bottom arch bar portions, and a plurality of pedestal tie bar portions; said truck column portions having their contacting edges abutted in a central vertical longitudinal plane passing through the truck, and means for maintaining adjacent surfaces of the abutted edges in flush relation, said means also serving to resist shear strains.

17. A car truck side frame involving inner and outer side walls arranged in spaced relation, each of said walls having a plurality of truck column portions, a plurality of top arch bar portions, a plurality of bottom arch bar portions, and a plurality of pedestal tie bar portions; and rivet means uniting said truck column portions, said means extending through said inner and outer side walls and being adapted to resist shear strains.

18. A car truck side frame involving inner and outer side walls arranged in spaced relation, each of said walls having a plurality of truck column portions, a plurality of top arch bar portions, a plurality of bottom arch bar portions, and a plurality of pedestal tie bar portions; and rivet means uniting said truck column portions, said rivet means being adapted to resist shear strains.

19. A car truck side frame involving inner and outer side walls arranged in spaced relation, each of said walls having a plurality of truck column portions having openings partially formed in each, a plurality of top arch bar portions, a plurality of bottom arch bar portions, and a plurality of pedestal tie bar portions; and weld means uniting said truck colmun portions, said weld means being located in said openings and adapted to resist shear strains.

20. A car truck side frame involving inner and outer side walls arranged in spaced relation, each of said walls having a plurality of truck column portions, a plurality of top arch bar portions, a plurality of bottom arch bar portions, and a plurality of pedestal tie bar portions; means uniting the truck column portions to form a bolster opening with smooth transverse surfaces bordering said opening, and rivets adapted to connect the said side walls, said rivets being located about said bolster opening.

21. A car truck side frame involving inner and outer side walls arranged in spaced relation, each of said walls having a plurality of truck column portions, a plurality of top arch bar portions, a plurality of bottom arch bar portions, and a plurality of pedestal tie bar portions; inwardly extending flanges provided on the truck column portions, weld means connecting said flanges, and a plurality of tie members adjacent said weld means and adapted to unite said side walls.

22. A car truck side frame involving inner and outer side walls arranged in spaced relation, each of said walls having a plurality of truck column portions, a plurality of top arch bar portions, a plurality of bottom arch bar portions, and a plurality of pedestal tie bar portions; a plurality of inwardly extending flanges adapted to be united on a longitudinal plane passing through the truck frame and arranged to form a bolster opening and transversely disposed means adjacent the bolster opening for uniting the side walls of the truck.

23. A car truck side frame involving a continuous sheet of metal folded at the bottom and shaped to form inner and outer side walls arranged in spaced relation, each of said side walls having a plurality of truck column portions, a plurality of top arch bar portions, a plurality of bottom arch bar portions, and a plurality of pedestal tie bar portions; said bottom arch bar portions being provided with inwardly extending flanges, and means including a plurality of intermeshing portions provided on said flanges for uniting the same.

24. A car truck side frame involving a continuous sheet of metal folded at the bottom and shaped to form inner and outer side walls arranged in spaced relation, each of said side walls having a plurality of truck column portions, a plurality of top arch bar portions, a plurality of bottom arch bar portions, and a plurality of pedestal tie bar portions; and means including a plurality of interlocked portions formed on said bottom arch bar portions for connecting the same.

25. A car truck side frame involving a continuous sheet of metal folded at the bottom and shaped to form inner and outer side walls arranged in spaced relation, each of said side walls having a plurality of truck column portions, a plurality of top arch bar portions, a plurality of bottom arch bar portions, and a plurality of pedestal tie bar portions; and means including an interlocked portion carried by and adapted to unite said bottom arch bar portions.

26. A car truck side frame involving a continuous sheet of metal folded at the bottom and adapted to form inner and outer side walls arranged in spaced relation, each of said side walls having a plurality of truck column portions, a plurality of top arch bar portions, a plurality of bottom arch bar portions, and a plurality of pedestal tie bar portions; and means including a plurality of intermeshing portions provided on the lower edges of said bottom arch bar portions for uniting the same.

27. A car truck side frame involving spaced inner and outer side walls, each of said walls having a plurality of truck column portions, a plurality of top arch bar portions, a plurality of bottom arch bar portions, and a plurality of pedestal tie bar portions; means for interlocking portions of said bottom arch bar portions, and means for maintaining said interlocked portions in the same plane.

28. A car truck side frame involving spaced inner and outer side walls, each of said walls having a plurality of truck column portions, a plurality of top arch bar portions, a plurality of bottom arch bar portions, and a plurality of pedestal tie bar portions; means for interlocking portions of said bottom arch bar portions, and a plurality of rivets passing through adjacent interlocked portions for maintaining said portions in the same plane.

29. A car truck side frame involving spaced inner and outer side walls, each of said walls having a plurality of truck column portions, a plurality of top arch bar portions, a plurality of bottom arch bar portions, and a plurality of pedestal tie bar portions; a plurality of projections provided on said bottom arch bar portions and adapted to be intermeshed one with the other, and means for firmly connecting said intermeshed portions, said means also serving to resist shear strains.

30. A car truck side frame involving spaced inner and outer side walls, each of said walls having a plurality of truck column portions, a plurality of top arch bar portions, a plurality of bottom arch bar portions, and a plurality of pedestal tie bar portions; and means for interlocking adjacent bottom arch bar portions of said side walls.

31. A car truck side frame involving spaced inner and outer side walls, each of said walls having a plurality of truck column portions, a plurality of top arch bar portions, a plurality of bottom arch bar portions, and a plurality of pedestal tie bar portions; means for interlocking adjacent bottom arch bar portions of said side walls, and means firmly connecting said interlocked portions, said last named means being adapted to resist shear strains.

32. A car truck side frame involving a wrought metal sheet shaped to form spaced inner and outer side walls, each of said walls having a plurality of truck column portions, a plurality of top arch bar portions, a plurality of bottom arch bar portions, and a plurality of pedestal tie bar portions; and a plurality of interlocking portions provided on said bottom arch bar portions, said interlocking portions being arranged to extend over the journal boxes.

33. A car truck side frame involving a wrought metal sheet shaped to form spaced inner and outer side walls, each of said walls having a plurality of truck column portions, a plurality of top arch bar portions, a plurality of bottom arch bar portions, and a plurality of pedestal tie bar portions; and a plurality of interlocking portions provided on said bottom arch bar portions, said interlocking portions being arranged to extend over the journal boxes and being connected together by welding.

34. A car truck side frame involving a wrought metal sheet shaped to form spaced inner and outer side walls, each of said walls having a plurality of truck column portions, a plurality of top arch bar portions, a plurality of bottom arch bar portions, and a plurality of pedestal tie bar portions; a plurality of interlocking portions provided on said bottom arch bar portions, said interlocking portions being arranged to extend over the journal boxes, and means for reinforcing the interlocked portions above the journal box.

35. A car truck side frame involving a wrought metal sheet shaped to form spaced inner and outer side walls, each of said walls having a plurality of truck column portions, a plurality of top arch bar portions, a plurality of bottom arch bar portions, and a plurality of pedestal tie bar portions; a plurality of interlocking portions provided on said bottom arch bar portions, said interlocking portions being arranged to extend over the journal box, and a plate connected to said interlocked portions above the journal box.

36. A car truck side frame involving a wrought metal sheet shaped to form spaced inner and outer side walls, each of said walls having a plurality of truck column portions, a plurality of top arch bar portions, a plurality of bottom arch bar portions, and a plurality of pedestal tie bar portions, means connecting the edges of said bottom arch bars above the journal box, and reinforcing means beneath and directly connected to said connected edges of the said bottom arch bars.

37. A car truck side frame involving a wrought metal sheet shaped to form spaced inner and outer side walls, each of said walls having a plurality of truck column portions, a plurality of top arch bar portions, a plurality of bottom arch bar portions, and a plurality of pedestal tie bar portions; means uniting opposite portions of the bottom arch bars above the journal box, and reinforcing means including a member beneath and welded to the united portions of said bottom arch bars above the journal box.

38. A car truck side frame involving a wrought metal sheet shaped to form spaced inner and outer side walls, each of said walls having a plurality of truck column portions, a plurality of top arch bar portions, a plurality of bottom arch bar portions, and a plurality of pedestal tie bar portions; and a plurality of interlocking portions provided on said bottom arch bar portions and extending over the journal boxes, said interlocking portions forming a staggered joint.

39. A car truck side frame involving a wrought metal sheet shaped to form spaced inner and outer side walls, each of said walls having a plurality of truck column portions, a plurality of top arch bar portions, a plurality of bottom arch bar portions, and a plurality of pedestal tie bar portions, said pedestal tie bar portions being box-shaped.

40. A car truck side frame involving a wrought metal sheet shaped to form spaced inner and outer side walls, each of said walls having a plurality of truck column portions, a plurality of top arch bar portions, a plurality of bottom arch bar portions, and a plurality of pedestal tie bar portions; inwardly extending flanges provided on said pedestal tie bar portions, and means interlocking said flanges beneath the journal boxes.

41. A car truck side frame involving a wrought metal sheet shaped to form spaced inner and outer side walls, each of said walls having a plurality of truck column portions, a plurality of top arch bar portions, a plurality of bottom arch bar portions, and a plurality of pedestal tie bar portions; and a plurality of interlocking portions provided on said pedestal tie bar portions, said interlocking portions being arranged to extend beneath the journal box.

42. A car truck side frame involving a wrought metal sheet shaped to form spaced inner and outer side walls, each of said walls having a plurality of truck column portions, a plurality of top arch bar portions, a plurality of bottom arch bar portions, and a plurality of pedestal tie bar portions; and a plurality of interlocking portions provided on said pedestal tie bar portions, said interlocking portions being arranged to extend beneath the journal box, and weld means adapted to firmly unite the said interlocked portions beneath the journal box.

43. A car truck side frame involving a wrought metal sheet shaped to form spaced inner and outer side walls, each of said walls having a plurality of truck column portions, a plurality of top arch bar portions, a plurality of bottom arch bar portions, and a plurality of pedestal tie bar portions; and a plurality of interlocking portions provided on said pedestal tie bar portions and arranged to extend beneath the journal box, said interlocking portions forming a staggered joint.

44. A car truck side frame involving a wrought metal sheet shaped to form spaced inner and outer side walls, each of said walls having a plurality of truck column portions, a plurality of top arch bar portions, a plurality of bottom arch bar portions, and a plurality of pedestal tie bar portions; and a plurality of interlocking projections provided on said top arch bar portions, said bottom arch bar portions, and pedestal tie bar portions, said projections being provided with a plurality of alined openings adapted to receive the journal box bolts.

45. A car truck side frame comprising a continuous metallic sheet folded at its bottom to form inner and outer side walls, and means including an interlocked portion for firmly uniting said walls in spaced relation.

46. A car truck side frame comprising a wrought metal sheet shaped to form spaced inner and outer side walls, and means including spaced intercalated tongues for portions of said side walls.

47. A car truck side frame comprising a wrought metal sheet shaped to form spaced inner and outer side walls, means including an interlocked portion for uniting said side walls, and means for maintaining said interlocked portions in alinement.

48. A car truck side frame comprising a wrought metal sheet shaped to form spaced inner and outer side walls, means interlocking said side walls against longitudinal displacement, and means transversely connecting said side walls.

49. The method of manufacturing a sheet metal car truck side frame which consists in forming a metallic blank with symmetrical portions each having corresponding side frame portions, cutting and bending portions of each of said side frame portions to form interlocking flanges, and uniting said flanges.

50. The method of manufacturing a sheet metal car truck side frame which consists in forming a metallic blank with symmetrical portions each having corresponding side frame portions, cutting and bending portions of each of said side frame portions to form interlocking flanges, welding some of said interlocking flanges for maintaining them in alinement, and finally transversely uniting other of said flanges by rivets.

51. The method of manufacturing a sheet metal car truck side frame which consists in forming a metallic blank with symmetrical portions each having corresponding side frame portions, cutting and bending portions of each of said side frame portions to form interlocking flanges, and finally uniting some of said flanges by welding.

52. The method of manufacturing a sheet metal car truck side frame which consists in forming a continuous metallic blank with symmetrical portions each having corresponding side frame portions, cutting portions on each symmetrical portion, folding said blank on its axis of symmetry, and interlocking said cut portions, and finally welding portions of said interlocked portions.

53. The method of manufacturing a sheet metal car truck side frame which consists in forming a continuous metallic blank with symmetrical portions each having corresponding side frame portions, cutting portions on each symmetrical portion, folding said blank at its bottom on its axis of symmetry and interlocking said cut portions, and finely uniting said interlocked portions by welding and riveting.

54. A side frame formed integral from one plate, certain members of which are secured together by interlocking connections.

55. A truck frame composed of one metal plate, having a top portion, two side portions extending therefrom and spaced apart, some of the members having inwardly extending flanges provided with interlocking connections, whereby they are secured together.

56. A truck frame composed of one metal plate, including a top portion, a bottom portion, side portions composed of members connecting the same, said side portions being spaced apart and some of them being provided with inturned flanges, some of said flanges having notched portions and others tongue portions located therein, whereby the parts are firmly secured together.

57. An integral frame for car trucks, composed of a single plate of metal forming the various members thereof, having a top member, side members extending from the upper member in substantial parallelism and spaced apart, a bottom member, inwardly extending flanges on certain of said members cooperating with each other, one of the same having a notched portion and the other a tongue adapted to interlock and thereby secure the parts together.

58. A side frame for car trucks of the integral arch bar type, comprising a single plate of metal bent about its intermediate portion, forming a top arch bar, a bottom arch bar, inclined tension members, column guides, and pedestal tie bars, certain of said members having inturned flanges adapted to contact with each other, one of each of said flanges being provided with an integral tongue portion and its companion having a notched portion adapted to interlock, whereby the parts are firmly secured together.

59. A side frame for car trucks, comprising a single plate of metal bent about its intermediate portion, forming a top member, a bottom member, and side members, the sides of which are spaced apart, some of them having inturned flanges, portions of said flanges being provided with integral tongues, and integral notches in the adjacent portions, adapted to interlock and secure them together.

60. A side frame for a car truck, composed of various members, portions of some of which are provided with outstanding flanges secured together by integral tongue and notch connections.

In testimony whereof I affix my signature.

GUSTAF A. ANDERSON.